US012725586B2

(12) United States Patent
Chykeyuk et al.

(10) Patent No.: US 12,725,586 B2
(45) Date of Patent: Sep. 1, 2026

(54) DISPLAY SYSTEM AND METHOD OF OPERATION

(71) Applicant: Kino-mo Ltd., London (GB)

(72) Inventors: Kiryl Chykeyuk, London (GB); Dzmitry Malinouski, Minsk (BY); Alexandr Zhuravliov, Minsk (BY); Mikalai Sauchuk, Minsk (BY)

(73) Assignee: Kino-mo Ltd. (GB)

( * ) Notice: Subject to any disclaimer, the term of this patent is extended or adjusted under 35 U.S.C. 154(b) by 0 days.

(21) Appl. No.: 18/715,055

(22) PCT Filed: Nov. 24, 2022

(86) PCT No.: PCT/GB2022/052981
§ 371 (c)(1),
(2) Date: May 30, 2024

(87) PCT Pub. No.: WO2023/099871
PCT Pub. Date: Jun. 8, 2023

(65) Prior Publication Data

US 2025/0037681 A1 Jan. 30, 2025

(30) Foreign Application Priority Data

Dec. 1, 2021 (GB) .................................... 2117348

(51) Int. Cl.
*G09G 5/10* (2006.01)
*G06F 3/14* (2006.01)
(Continued)

(52) U.S. Cl.
CPC ............. *G09G 5/12* (2013.01); *G06F 3/1446* (2013.01); *G09F 9/3026* (2013.01); *G09F 9/37* (2013.01);
(Continued)

(58) Field of Classification Search
None
See application file for complete search history.

(56) References Cited

U.S. PATENT DOCUMENTS

2009/0002270 A1 1/2009 Chui
2010/0020107 A1* 1/2010 Chui ...................... G09G 3/005 345/690

FOREIGN PATENT DOCUMENTS

CN 110097843 A 8/2019
WO 2013123458 A1 8/2013

OTHER PUBLICATIONS

International Search Report and Written Opinion for PCT/GB2022/052981 dated Jan. 5, 2023, 21 pages, Rijswijk, NL.

(Continued)

*Primary Examiner* — Carl Adams
(74) *Attorney, Agent, or Firm* — Thorpe North & Western, LLP.

(57) ABSTRACT

A display system comprises a plurality of displays, each display comprising: at least one light source movable along a predetermined closed path; an image controller to modulate the light intensity to display an image using persistence of vision; a drive for moving the light source—a sensor for synchronizing the light source's movement along the path; and a drive speed controller that maintains a phase shift between the sensor's sync signal and a reference signal, ensuring the desired rotational speed of the light source. The displays arranged into at least two groups, each group having its own plane in which the at least one light source moves. The displays are arranged in a grid, with adjacent displays in different groups moving along overlapping paths in opposite directions. The phase shift maintained so that the light sources and the elements on which they are mounted of different groups do not obscure.

20 Claims, 6 Drawing Sheets

(51) Int. Cl.
*G09F 9/302* (2006.01)
*G09F 9/37* (2006.01)
*G09G 3/00* (2006.01)
*G09G 5/12* (2006.01)

(52) U.S. Cl.
CPC ....... *G09G 3/005* (2013.01); *G09G 2300/026* (2013.01); *G09G 2320/028* (2013.01); *G09G 2356/00* (2013.01); *G09G 2360/04* (2013.01)

(56) References Cited

OTHER PUBLICATIONS

UKIPO Search Report for GB2117348.9 dated May 16, 2022, 1 page, Newport, South Wales.

International Search Report for PCT/GB2022/052981 dated Jan. 5, 2023, 2 pages, Rijswijk, NL.

* cited by examiner

DISPLAY SYSTEM AND METHOD OF OPERATION

FIELD OF THE INVENTION

The invention relates to a display system comprising a plurality of display modules and to a method for displaying a desired image using a plurality of display modules.

BACKGROUND

A variety of different types of device are used for display of images. One type is that in which light sources are moved along a path, typically circular, and the intensity of light emitted by the light sources as they move along the path is varied in order to produce an image to be visible by virtue of persistence of vision. A particular advantage of this type of display is that an image can be produced using relatively few light sources.

This type of display is particularly attractive for use in a variety of applications such as retail displays, advertising and at public events. Each circumstance within these applications tends to be different, however, requiring a large number of display sizes to be available. This is costly in terms of designing and manufacturing bespoke displays to suit each of the circumstances. Moreover, there are engineering difficulties when larger displays are required since, when a linear array of lights sources is rotated to produce the image, the speed of motion of the light sources can be extremely high at the point furthest from the centre of rotation in order to ensure an adequate refresh rate. Aside from the potential danger involved with such high speeds of operation, unless measures are taken to balance the array, there is inevitably some vibration which can lead to image distortion.

One approach to overcoming these problems uses display modules to make up a larger display. The modules are mechanically coupled to ensure that their respective arrays of lights sources all rotate in synchrony and without collision with each other. However, this arrangement is expensive to implement, rather cumbersome and noisy owing to the mechanical linkages. This makes it unsuitable for a large number of circumstances in which such types of display could otherwise be used.

Some of these problems could be overcome using an electronic system of synchronisation. However, the systems proposed so far are impractical for a variety of reasons. First, there is massive inertia when the modules begin to rotate, and this cannot easily be controlled by a simple electronic system. Also, slight variations exist in the acceleration profiles of different motors in adjacent modules, each module might experience different degrees of air resistance as the light sources begin to rotate and air flow disturbances can be experienced by one module more than an adjacent module. This causes the modules to rotate without the required synchronisation as the system starts. There is therefore a significant risk that there will be a collision and resultant damage during start-up. We have found that these problems exist for around one to three minutes after start-up. Moreover, the arrays of light sources need to be held in the correct relative positions (e.g. 45 degrees rotational offset between the light source arrays of adjacent modules). Such a system therefore inevitably requires some form of mechanical interlock to hold the arrays of light sources on each of the modules in the correct position to start up successfully.

One way around these issues is to stagger adjacent modules so that the arrays of light sources of adjacent modules lie in different planes. This way, they cannot collide even though they are unsynchronised. However, as the array of one module passes in front of those of an adjacent module, undesirable image artefacts are generated.

One of these artefacts is shown in FIGS. 1*a*-1*e* and 2. In FIG. 1*a*, two cross-shaped arrays of light-emitting diodes (LEDs) are shown. One of the arms of the array on the left passes in front of one of the arms of the array on the right. A detailed view of this is also shown, in which it can be seen that the arm of the array on the left is obscuring some of the LEDs on the array on the right. The two arrays are counter-rotating. FIG. 1*a* shows the situation where the array on the left is 10° from the horizontal and that on the right is 15° from the horizontal.

FIG. 1*b* shows the situation after the arrays have rotated another 5°. Thus, the array on the left is now 15° from the horizontal, and the array on the right at 20° from the horizontal. In the detailed view, the array on the left can be seen to be obscuring a different set of LEDs on the array on the right to those obscured in FIG. 1*a*. The quadrilateral shape labelled 1 in the detailed view shows those pixels previously obscured.

FIG. 1*c* shows the situation after the arrays have rotated another 5°. Thus, the array on the left is now 20° from the horizontal, and the array on the right at 25° from the horizontal. In the detailed view, the array on the left can be seen to be obscuring a different set of LEDs on the array on the right to those obscured in FIGS. 1*a* and 1*b*. The quadrilateral shapes labelled 1 and 2 in the detailed view shows those pixels previously obscured.

Thus, as the arrays rotate, a roughly arcuate portion of the array on the right is obscured. The overall effect is shown in FIG. 2. The circular outline described by the left and right arrays are shown by reference numbers 3 and 4 respectively. The roughly arcuate portion that is obscured is shown by reference number 5. It appears as a black portion in the image generated by the two arrays. This phenomenon is known as the "dead pixels" artefact.

A second image artefact is illustrated in FIG. 3. In this, there are again, two arrays: a left-hand array 6 and a right-hand array 7. One way to show a single image on the two arrays would be to use the full area of the left-hand array to generate an image, whereas only the portion of the right-hand array which does not pass behind the left-hand array would be used. This is illustrated by the hatched portions on the fronts of the two arrays 6, 7 in FIG. 3. This approach works well when viewed perpendicularly. However, when the viewer moves off-axis such as is shown in FIG. 3 by the arrows looking into the gap between arrays 6 and 7, no image is visible in the portion of the right-hand array 7 behind the left-hand array 6.

Therefore, whilst the approach described in the immediately preceding paragraph would solve the dead pixels problem, it creates its own problem. Various attempts have been made to overcome this involving controlling the brightness of the overlapping portions of the images produced by the LEDs of each array 6, 7. However, these reintroduce the dead pixels problem, and there exists a trade-off between the dead pixels problem and the existence of gaps in the image becoming visible when viewed off-axis.

SUMMARY OF THE INVENTION

In accordance with a first aspect of the invention, there is provided a display system comprising a plurality of display modules, each display module comprising: at least one light source movable along a predetermined closed path; an image controller adapted to modulate the intensity of light emitted by the at least one light source as it moves along the predetermined closed path so as to cause a desired image to be visible by virtue of persistence of vision; a drive mechanically coupled to the at least one light source for moving the at least one light source along the predetermined closed path; a sensor which generates a synchronisation signal including a synchronisation feature indicating the passage of the at least one light source past a datum point on the predetermined closed path; and a drive controller for controlling the speed of the drive, the drive controller being adapted to receive the synchronisation signal from the sensor and a reference signal including a periodic timing feature having a period based on a desired speed of revolution of the at least one light source along the predetermined closed path, wherein the drive controller is further adapted to produce a drive signal to control the speed of the drive such that a phase shift between the synchronisation feature or a phase-shifted version of it and the timing feature or a phase-shifted version of it is maintained at a predetermined value; wherein the plurality of display modules are arranged into at least two groups, each of the at least two groups comprising one or more of the plurality of display modules, and the predetermined closed path of the or each display module in each group lying in a plane associated with the group, the plane associated with each group being unique to that group; wherein the display modules are disposed such that each lies within a region around the intersection of a row and a column in a grid, each module being adjacent, in its row and column, only to modules in a different one of the at least two groups, the light sources of each adjacent pair of display modules moving along their predetermined closed paths in opposing senses and the predetermined close paths of each adjacent pair overlapping; wherein the predetermined value of the phase shift between the synchronisation feature or phase-shifted version of it and the timing feature or phase-shifted version of it for each of the plurality of display modules is selected such that the at least one light source or a member on which it is mounted does not occupy a position in which the at least one light source or the member on which it is mounted obscures the at least one light source of another of the plurality of display modules.

By controlling the speed of the drive in each display module to maintain the phase shift between the synchronisation feature (or phase-shifted version of it) and the timing feature (or phase-shifted version of it) at a predetermined value, it is possible to ensure that the at least one light source (or the arm or member on which it is mounted) of a first display module will not be directly in front of the at least one light source of another display module arranged adjacent to the first display module, the phase shift between the other display module's synchronisation feature (or phase-shifted version of it) and timing feature (or phase-shifted version of it) also being controlled to a suitable predetermined value. Thus, the dead pixels problem described above is overcome.

The at least one light source of each display module will usually be an array of light sources. The array of light sources may be arranged in a number of shapes, but a typical one is a cross-shaped array as, for example, shown in FIG. 1. LEDs make an excellent choice for the light sources since they are economical to purchase and are very power-efficient in operation. The at least one light source may be capable of emitting light in a spectrum of different colours, for example corresponding to a predefined gamut such as sRGB or Adobe® RGB. For this purpose, RGB LEDs are particularly suitable. To accommodate the use of light sources capable of emitting light in a spectrum of different colours to reproduce a desired image that is in colour, the image controller may be adapted to modulate the intensity and colour of the light emitted by the at least one light source as it moves along the predetermined closed path.

Each region around the intersections of the rows and columns in the grid may extend by an amount of 1, 2, 3, 4, 5, 6, 7, 8, 9 or 10 centimetres from the intersection. Each display modules may lie directly on a respective intersection or anywhere else within the region around it.

Typically, the at least one light source is mounted on one or more arms which may be made of a transparent or opaque material (such as a plastic or metal). For example, in the case where the at least one light source is array of light sources arranged in a cross-shape, there may be two arms joined at the centre of the cross. The arms may be made from aluminium, steel or a suitable engineering plastic like nylon.

The predetermined closed path along which the or each light source of each display module moves will usually be circular. Where the at least one light source is an array of light sources, each light source may be movable along its own unique predetermined closed path. Thus, when the predetermined closed paths are circular, each light source moves around a central axis along its own unique circular path. When the array of light sources is a cross-shape, the light sources on one of the two arms may interlace with those on the other arm.

The drive of each display module may be a motor, such as a brushless DC (BLOC) motor. The at least one light source may be coupled to the motor's drive shaft. Thus, the at least one light source will rotate around the central axis defined by the motor's drive shaft. Where, for example, the at least one light source is a cross-shaped array, the cross may be mounted to the motor's drive shaft at its centre.

The sensor of each display module may detect the passage of a respective indexing feature having a fixed spatial relationship to the at least one light source of the display module as it moves along its predetermined closed path, the sensor generating a pulse in the synchronisation signal in response to the passage of the indexing feature past the sensor.

The sensor may be an optical sensor, for example one that works by detecting the reflection of light which it emits. In this case, the indexing feature can be reflective or a gap in a reflective strip that passes the sensor as the at least one light source moves along the predetermined closed path. Another suitable type of optical sensor is a transmissive one that detects light emitted by a light source in the sensor that is able to reach a detector in the sensor. In this case, the indexing feature may be an opaque feature that interrupts the light reaching the detector, or it may be a gap in an opaque strip that allows the light to reach the detector.

As an alternative, the sensor may be a magnetic sensor. In this case, the indexing feature may be made of a magnetic material which the sensor can detect as it passes the sensor.

Each display module may further comprise one or more sub-indexing features spaced apart from each other and from the respective indexing feature such that each one of the indexing and sub-indexing features passes the sensor in turn as the at least one light source moves along the predetermined closed path, the sensor generating a pulse in the synchronisation signal in response to the passage of the or each sub-indexing feature past the sensor.

The presence of sub-indexing features improves the accuracy of synchronisation. The or each sub-indexing feature is usually smaller than the indexing feature. The sub-indexing feature may have a similar structure to those of the indexing feature described above for use with optical or magnetic sensors. A typical arrangement is to have a castellated disc with the castellations arranged either in the plane of the disc or perpendicular to it. Each castellation represents one of the indexing or sub-indexing features. Where the sensor is a transmissive optical one, the castellations are made of an opaque material which interrupt the light emitted by the light source in the sensor. When the sensor is a reflective optical one, the castellations are made of a reflective material which reflect the light emitted by the sensor back towards it. When the sensor is a magnetic one, the castellations are made of or include a magnetic material.

The display module may further comprise a second sensor which generates an image synchronisation signal indicating the passage of the at least one light source past an image start point on the predetermined closed path. Alternatively, the image synchronization signal may be generated from the synchronisation signal, the image start point having a fixed spatial relationship with the datum point.

The image start point may be offset along the predetermined closed path relative to the datum point, or it may be at the datum point. The second sensor may be an optical or a magnetic one in the same manner as the sensor described above. The image synchronisation signal may be used by the image controller to determine when the at least one light source has reached a starting point for reproduction of the desired image. The image controller may then output lighting control signals to the at least one light source to modulate the intensity of light and/or colour emitted in accordance with image data defining the desired image and stored by the image controller, thereby reproducing the desired image.

The desired image may change with time to enable the reproduction of video images. To enable this, the image controller may be adapted to receive video data, for example over an HDMI connection.

The image controller of each display module may be further adapted to modulate the intensity of light emitted by the at least one light source in accordance with a respective brightness mask to adjust the intensity of light emitted by the at least one light source based on a predefined profile.

For example, the predefined profile may cause the intensity of light emitted by the at least one light source to be adjusted when it is in a position on the predetermined closed path that lies in a predefined overlap zone. The overlap zone may be a zone in which the predetermined closed path of one display module passes directly in front of that of another display module arranged adjacent to the first display module.

Thus, for example when the at least one light source is a cross-shaped array of light sources and the predetermined closed path is circular, the predefined profile may cause the intensity of light emitted by the light sources in the array to diminish within the overlap zone with increasing distance from the centre. This gradient profile allows the reproduction of an overall image across several adjacent display modules without the appearance of any gaps when the image is viewed off-axis. Thus, the overall image can be display without the second image artefact described above occurring. What is more, the trade-off mentioned above no longer exists, and both image artefacts we have described above no longer occur.

The reference signal may be generated by the display module itself. However, it may also be generated by an external control unit. This has the advantage that the reference signal may be distributed to a plurality of identical display modules. Therefore, the phase shift between the synchronisation feature or phase-shifted version of it and the timing feature or phase-shifted version of it for each module can be maintained at a respective phase shift with reference to the same reference signal. Synchronisation of the at least one light source of each module as they rotate around their respective predetermined closed paths can therefore be ensured.

The synchronisation feature is typically a pulse (such as the pulse generated by the sensor on passage of the indexing feature described above). Similarly, the periodic timing feature is typically a pulse, occurring once for each revolution around the predetermined closed path. For example, where the at least one light source should move around the predetermined closed path at a rate of 750 revolutions per minute, the pulse may be generated at a rate of 750 times per minute or 12.5 Hz.

The drive controller may measure the time difference between the period timing feature or phase-shifted version of it and the synchronisation feature or phase-shifted version of it. This time difference can be used to calculate the actual phase shift between the synchronisation feature or phase-shifted version of it and the timing feature or phase-shifted version of it. When this phase shift is at the predetermined value, the time difference will have a required value. If the measured time difference is either more or less than the required value, the drive controller may adjust the speed of the drive to bring the measured time difference to the required value.

The predetermined value of the phase shift between the synchronisation feature or phase-shifted version of it and the timing feature or phase-shifted version of it may be set to 0°, 45°, or it may be any other value depending on the circumstances. The predetermined value of this phase shift will be specific (although not necessarily unique) to each display module. In one scenario, where a plurality of display modules are arranged adjacent to each other and with the predetermined closed paths of adjacent displays overlapping, the predetermined value of the phase shift between the synchronization feature and a phase-shifted version of the timing feature is maintained at 180°. The reference signal is received by each display module and phase-shifted by a respective amount to introduce a specific phase-shift for that display module. The specific phase-shift may be different for different display modules or groups of display modules, and this allows the relative positions of the at least one light source on adjacent display modules to be controlled as they move along their predetermined closed paths so that the at least one light source or a member on which it is mounted in a first one of the adjacent displays does not occupy a position in which the at least one light source or the member on which it is mounted obscures the at least one light source of the other of the adjacent display modules.

The predetermined value of the phase shift between the synchronisation feature or phase-shifted version of it and the timing feature or phase-shifted version of it may be programmed into a memory device on manufacture of the display module. Alternatively, it may be programmed by a user using suitable software running on a desktop computer or mobile phone. The software may communicate with an external control unit coupled to an interface on the display module using a fibre optic cable. Image data representing the desired image (or succession of images in the form of video data) may also be communicated to a memory device on the display module for access by the image controller.

As is apparent from the above discussion, the drive controller of each display module maintains a phase shift between the synchronisation feature or a phase-shifted version of it and the timing feature or a phase-shifted version of it at a predetermined value. This means that one of four things can be maintained at a predetermined value by the drive controller: i) the phase shift between the synchronisation feature and the timing feature; ii) the phase shift between a phase-shifted version of the synchronisation feature and the timing feature; iii) the phase shift between the synchronisation feature and a phase-shifted version of the timing feature; and iv) the phase shift between a phase-shifted version of the synchronisation feature and a phase-shifted version of the timing feature. The phase shift is measured with respect to the reference signal, one period of which represents a phase of 360°.

The predetermined value of the phase shift between the synchronisation feature or phase-shifted version of it and the timing feature or phase-shifted version of it for each of the plurality of display modules may be dynamically adjustable. For example, of successive revolutions or numbers of revolutions around the predetermined closed path, the predetermined value may be adjusted or modified by a few degrees, say 1 to 5°.

The rows and columns in the grid may lie on horizontal and vertical axes respectively. Alternatively, the rows and columns may lie at an angle to the horizontal and vertical. Each of the plurality of display modules may be arranged into a respective one of first and second groups, each module in the first group being adjacent, in its row and column, only to modules in the second group and each module in the second group being adjacent, in its row and column, only to modules in the first group.

The first sense may be clockwise and the second sense anti-clockwise, or vice-versa.

The phase shift between the synchronisation feature or phase-shifted version of it and the timing feature or phase-shifted version of it of each display module may be a multiple of 45° and different to the phase shift between the synchronisation feature or phase-shifted version of it and the timing feature or phase-shifted version of it of each adjacent display module in its row and column.

The display system may further comprise an external control unit which generates the reference signal. The external control unit may communicate with a set of the plurality of display modules using one or more fibre optic cables. The fibre optic cables may transmit signals such as the reference signal. It may also communicate image data representing the desired image (or succession of images in the form of video data) for use by the image controller in the display modules. The set of the plurality of display modules may include all the display modules. However, in some cases, there may be multiple external control units, each allocated to a respective set of the display modules. The multiple external control units may be coupled together to share the reference signal and image data using, for example, HDMI connections.

Each display module may be assigned to a respective row and column within the grid, and the external control unit may comprise a memory in which the assigned row and column for each display module is stored. Each display module may be assigned to its respective row and column within the grid by a user using a software application that can communicate with the external control unit.

The external control unit may be coupled to each of the display modules by a communications link (for example, the fibre optic cables above) over which image data may be transmitted to each display module, the image data representing a portion of an overall image to be displayed by all of the display modules together.

The external control unit may comprise an image processor which, for each display module, offsets the portion of the overall image represented by the image data by a calibration amount to account for misplacement of the display module. The calibration amount can be set by a user during a setup process using a software application that can communicate with the external control unit. By displaying calibration images on each display module and accepting user input to indicate how these images need to be adjusted to account for discrepancies caused by imperfect mounting of a display module, the external control unit can determine a suitable translational offset to be applied to the image data.

The predetermined value of the phase shift between the synchronisation feature or phase-shifted version of it and the timing feature or phase-shifted version of it for each of the plurality of display modules may be selected such that the difference between the predetermined values of each adjacent pair has a desired value or lies between upper and lower threshold values, thereby setting an initial phase shift between the synchronisation feature or phase-shifted version of it and the timing feature or phase-shifted version of it for each of the plurality of display modules.

Typically, the desired value will be 45° for the case where the phase shift between the synchronisation feature and the timing feature is maintained at the predetermined value. However, this is a convenient value and not critical. In some situations, lower or higher values may be set, for example 42° or 48°. Thus, it is often appropriate to ensure that instead of having a desired value, the difference lies between upper and lower threshold values. In other cases where the the phase shift between the synchronisation feature and a phase-shifted version of the timing feature is maintained at the predetermined value, the desired value may be 180° or 0°.

The initial phase shift for each display module may be adjusted by addition or subtraction of an amount equal to an angle subtended by the sensor and a second sensor on the display module when joined by straight lines to a centre of the predetermined closed path, the second sensor generating an image synchronisation signal indicating the passage of the at least one light source past an image start point on the predetermined closed path.

The initial phase shift for a display module may be adjusted by a calibration amount input by a user to account for misalignment of the display module with one or more adjacent display modules.

The selection of the predetermined value to set the initial phase shift and adjustments to the initial phase shift may be made by the external control unit 11. This can be done on initialisation of the system. For example, the predetermined value may be set when the external control unit 11 is informed of the locations (i.e. the row and column in the grid) at which each display module is located. The adjustments can be made by the external control unit 11 based on information it stores regarding the angle subtended by the two sensors and user input it receives indicating the misalignment between adjacent display modules.

In accordance with a second aspect of the invention, there is provided a method for displaying a desired image using a plurality of display modules, each having at least one light source moveable along a respective predetermined closed path, the method comprising: arranging the plurality of display modules into at least two groups, each of the at least two groups comprising one or more of the plurality of display modules, and the predetermined closed path of the or each display module in each group lying in a plane associated with the group, the plane associated with each group being unique to that group; disposing the display modules such that each lies within a region around the intersection of a row and a column in a grid, each module being adjacent, in its row and column, only to modules in a different one of the at least two groups, the light sources of each adjacent pair of display modules moving along their predetermined closed paths in opposing senses and the predetermined closed paths of each adjacent pair overlapping; and carrying out the following steps at each of the plurality of display modules: moving the at least one light source along its respective predetermined closed path; modulating the intensity of light emitted by the at least one light source of each of the plurality of display modules as it moves along its respective predetermined closed path so as to cause a respective portion of the desired image to be visible by virtue of persistence of vision, the respective portions of the desired image visible on each of the plurality of display modules together forming the desired image; generating a respective synchronisation signal including a synchronisation feature indicating the passage of the at least one light source past a datum point on the respective predetermined closed path; receiving a reference signal including a periodic timing feature having a period based on the desired speed of revolution of the at least one light source along the respective predetermined closed path; and controlling the speed with which the at least one light source moves along the respective predetermined closed path such that the phase shift between the synchronisation feature or phase-shifted version of it and the timing feature or phase-shifted version of it is maintained at a predetermined value; wherein the predetermined value of the phase shift between the synchronisation feature or phase-shifted version of it and the timing feature or phase-shifted version of it for each of the plurality of display modules is selected such that the at least one light source does not occupy a position in which it obscures the at least one light source of another of the plurality of display modules.

The method may further comprise detecting at each display module, with a respective sensor, the passage of an indexing feature having a fixed spatial relationship to the at least one light source as it moves along the predetermined closed path, the sensor generating a pulse in the synchronisation signal in response to the passage of the indexing feature past the sensor.

At each display module, the sensor may generate a pulse in the synchronisation signal in response to the passage of one or more sub-indexing features spaced apart from each other and from the indexing feature such that each one of the indexing and sub-indexing features passes the sensor in turn as the at least one light source moves along the predetermined closed path.

The method may further comprise generating at each display module an image synchronisation signal indicating the passage of the at least one light source past an image start point on the predetermined closed path.

The method may further comprise modulating the intensity of light emitted by the at least one light source in accordance with a brightness mask to adjust the intensity of light emitted by the at least one light source based on a predefined profile.

The method may further comprise dynamically adjusting the predetermined value of the phase shift between the synchronisation feature or phase-shifted version of it and the timing feature or phase-shifted version of it for each of the plurality of display modules.

The method may further comprise arranging the plurality of display modules into first and second groups, each module in the first group being adjacent, in its row and column, only to modules in the second group and each module in the second group being adjacent, in its row and column, only to modules in the first group.

The phase shift between the synchronisation feature or phase-shifted version of it and the timing feature or phase-shifted version of it of each display module may be a multiple of 45° and different to the phase shift between the synchronisation feature or phase-shifted version of it and the timing feature or phase-shifted version of it of each adjacent display module in its row and column.

The method may further comprise generating the reference signal using an external control unit.

The method may further comprise assigning each display module to a respective row and column within the grid and storing the assigned row and column for each display module in the external control unit.

The method may further comprise transmitting image data to each display module, the image data representing a portion of an overall image to be displayed by all of the display modules together. For each display module, the portion of the overall image represented by the image data may be offset by a calibration amount to account for misplacement of the display module.

The predetermined value of the phase shift between the synchronisation feature or phase-shifted version of it and the timing feature or phase-shifted version of it for each of the plurality of display modules is selected such that the difference between the predetermined values of each adjacent pair has a desired value or lies between upper and lower threshold values, thereby setting an initial phase shift between the synchronization feature or phase-shifted version of it and the timing feature or phase-shifted version of it for each of the plurality of display modules.

The initial phase shift for each display may be adjusted by addition or subtraction of an amount equal to an angle subtended by first and second sensors on the display module when joined by straight lines to a centre of the predetermined closed path, the first sensor detecting the passage of an indexing feature having a fixed spatial relationship to the at least one light source as it moves along the predetermined closed path and the second sensor generating an image synchronization signal indicating the passage of the at least one light source past an image start point on the predetermined closed path.

The initial phase shift for a display module is adjusted by a calibration amount input by a user to account for misalignment of the display module with one or more adjacent display modules.

This method corresponds to the display system of the first aspect, and the discussion of that system applies to this method. Thus, any of the features mentioned above with respect to the display system may be combined with any of the features of this method.

BRIEF DESCRIPTION OF THE FIGURES

FIGS. 1*a* to 1*c* show two display modules in various positions and in an overlapping arrangement in which the dead pixels problem will occur.

DETAILED DESCRIPTION

Figure 2:
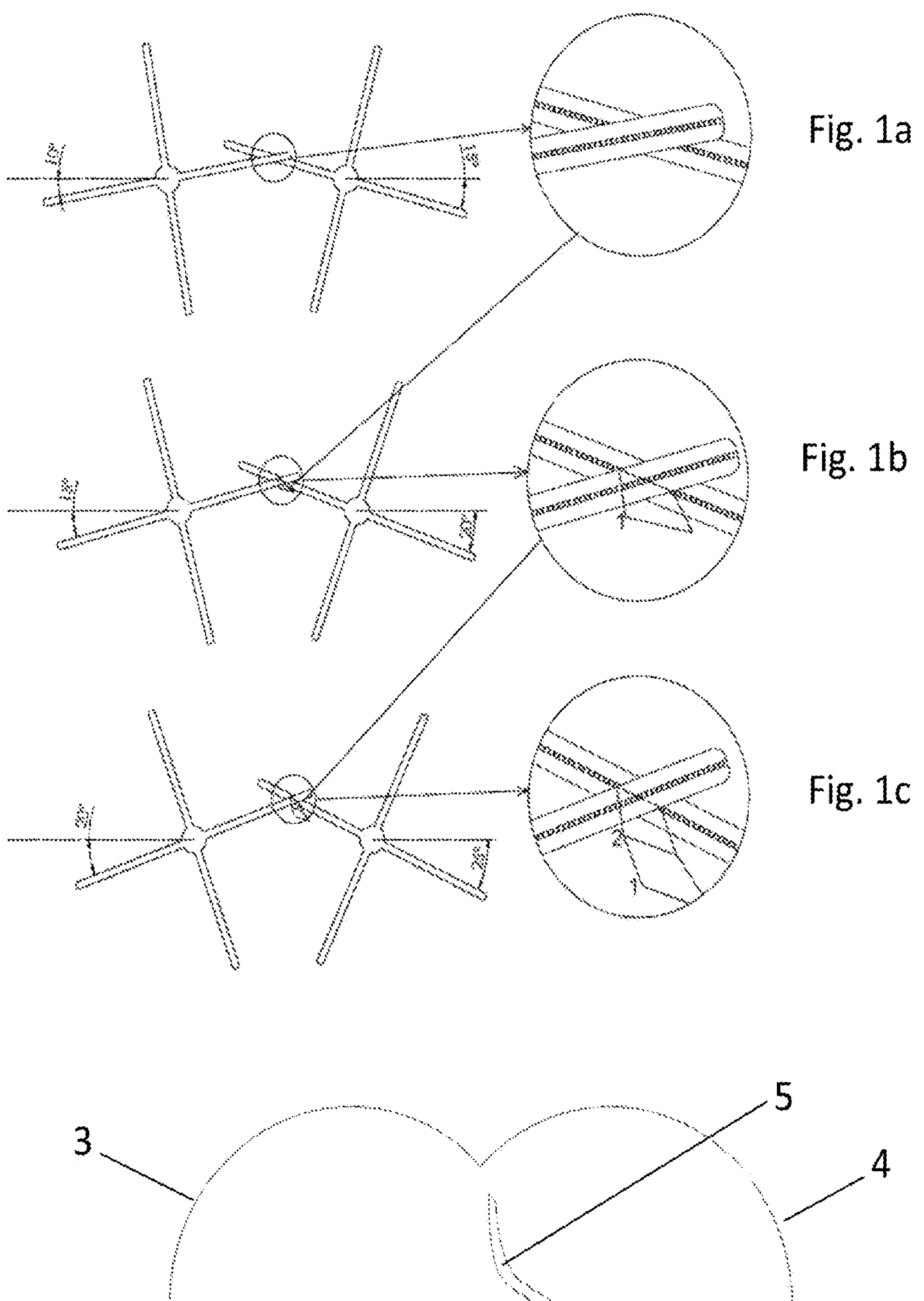
FIG. 2 shows the appearance of dead pixels.
Figure 3:
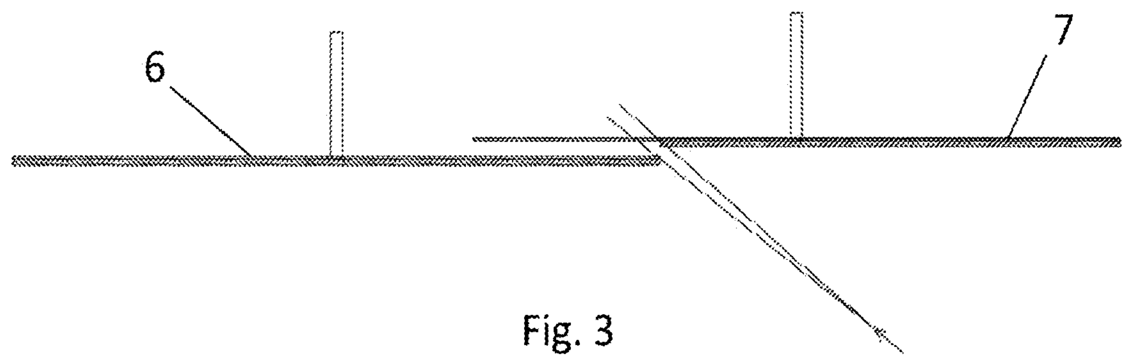
FIG. 3 shows the occurrence of another image artefact that occurs in the gap between adjacent displays arranged into two different planes.
Figure 4:
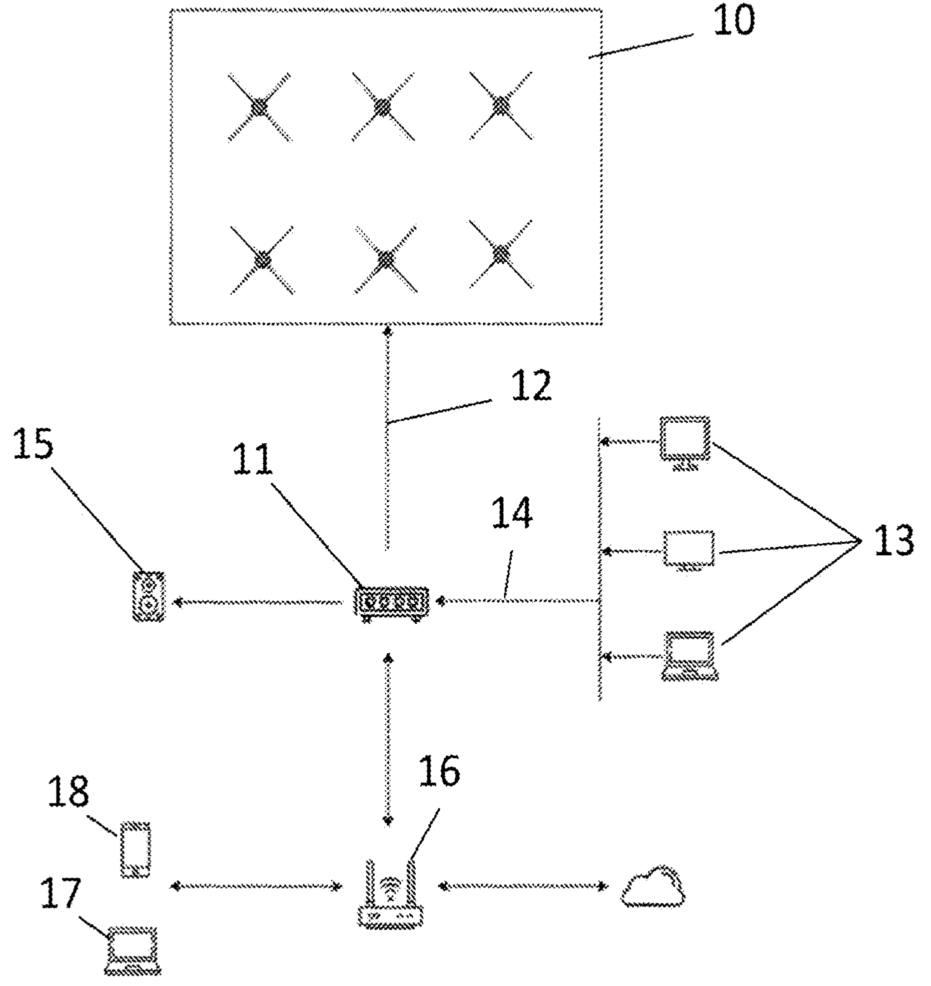
FIG. 4 shows a schematic diagram of a display system according to the invention.

FIG. 4 shows an array 10 of display modules. In this case, there are six display modules in the array 10. However, this number is arbitrary, and there may be more or fewer display modules in an array.

An external control unit 11 is connected to each of the display modules in the array 10 by way of a fibre optic cables 12. These fibre optic cables 12 (one per display module) are used to transmit a reference signal for synchronising the motion of the display modules in the array. They are also used to transmit image or video data to the display modules.

Image or video data may be provided to the external control unit 11 from a suitable source 13 (such as a desktop or laptop computer, a television, DVD or Blu-ray player) by way of an HDMI connection 14. The external control unit 11 can store image or video data that it has received from the source 13. This can then be transmitted on demand to the display modules 10 as needed. The image or video data may be transferred to the external control unit 11 by way of any suitable interface such as HDMI, Ethernet or Wi-Fi. The external control unity 11 can also pass image of video data received over HDMI directly to the display modules 10. The external control unit 11 may also be connected to a loudspeaker 15 to play back audio content accompanying the image or video data.

The external control unit may also connect via a router 16 (using Wi-Fi® or to the Internet or to a software application running on a computer 17 or mobile device 18. The computer 17 or mobile device 18 may be used to program the array as will be described later.

As mentioned above, the external control unit 11 provides a number of fibre optic outputs, each connected to a respective display module. If more display modules are required than there are fibre optic outputs, it is possible to connect additional external control units using HDMI cables. The HDMI cables are used to transmit image or video data between the external control units as well as the reference signal.

Figure 5A:
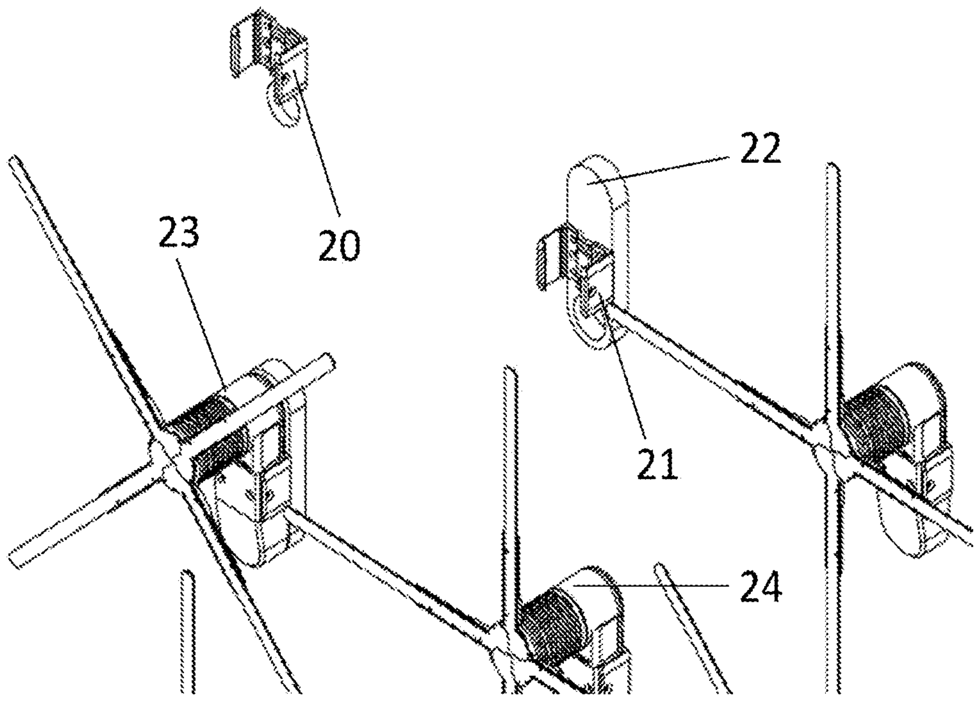
FIGS. 5*a* and 5*b* show an example of a mounting arrangement suitable for use with the display modules of the invention to produce a display system.
Figure 5B:
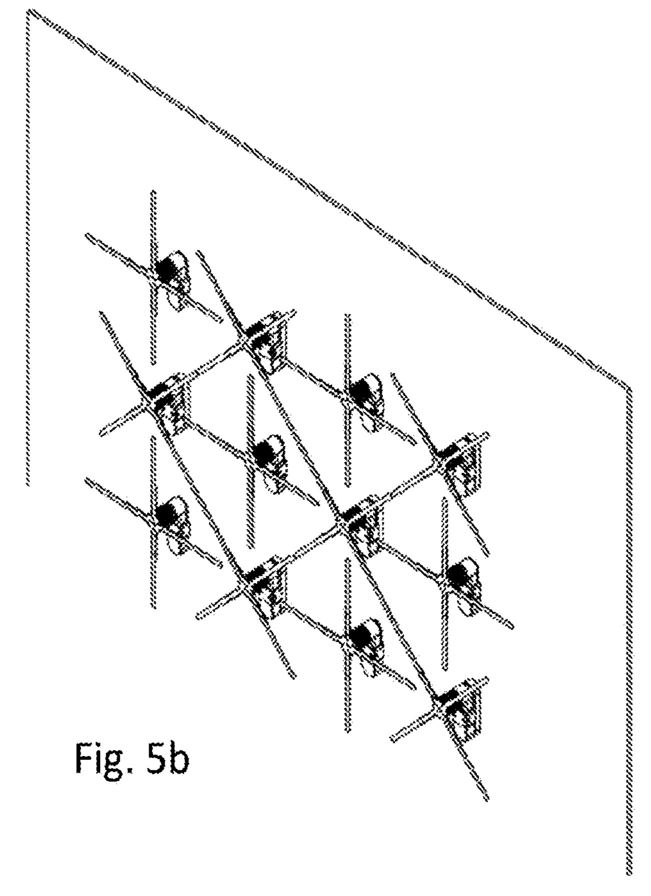

FIGS. 5*a* and 5*b* show one method of mounting the display modules to create a display system. The display modules have arrays of LEDs arranged on two arms in a cross shape. The LEDs are RGB LEDs so that they can reproduce a large spectral range of colours. The LEDs extend along the full length of the arms in the cross shape. They may be arranged so that the LEDs on one arm are interlaced with those on another.

In FIG. 5*a*, a clip 20 for holding a display module is shown mounted directly to a substrate such as a wall. An adjacent clip 21 is mounted on a standoff 22 which is in turn mounted to the substrate. The effect of this is that the arms of a display module mounted in the clip 21 will lie in a plane that is forwards (with respect to the substrate) to the plane in which the arms of a display module mounted in clip 20 will lie. Display module 23 is shown mounted in a clip with a standoff behind it, whereas adjacent display module 24 is mounted in a clip with no standoff.

This pattern of alternating the use of the standoff 22 is repeated in both vertical and horizontal directions so that a grid of display modules can be created as shown in FIG. 5*b*. In this, twelve display modules are arranged in three rows and four columns. Thus, the display modules in FIG. 5*b* shown with the cross-shaped arms oriented vertically and horizontally are mounted using the clips 20, 21 directly to a wall, whereas the display modules shown with the cross-shaped arms oriented at 45° to the horizontal and vertical are mounted to the wall using the clips and the standoffs 22. The arms on the displays mounted with the standoffs 22 all lie in the same plane forwards (with respect to the substrate) of a plane in which the arms on the displays mounted using just the clips 20, 21 lie.

In the arrangement of FIG. 5*b*, each display module lies at the intersection of a row and column in the grid. The display modules mounted directly with the clips represent a first group of display modules, and the display modules mounted using the standoffs as well as the clips represent a second group of display modules. Each module in the first group is adjacent, in its row and column, only to modules in the second group and each module in the second group is adjacent, in its row and column, only to modules in the first group. In other words, moving along any row or column, the display modules are arranged such that the cross-shaped arms are alternating between a rearwards plane or a forwards plane. This prevents the arms from being able to collide. As mentioned above, this is especially important as the system starts up when electronic synchronisation of the modules is used.

Each module is in the first group is caused to rotate in a first sense, for example clockwise, and each module in the second group is cause to rotate in a second, opposite sense, for example anti-clockwise.

Figure 6:
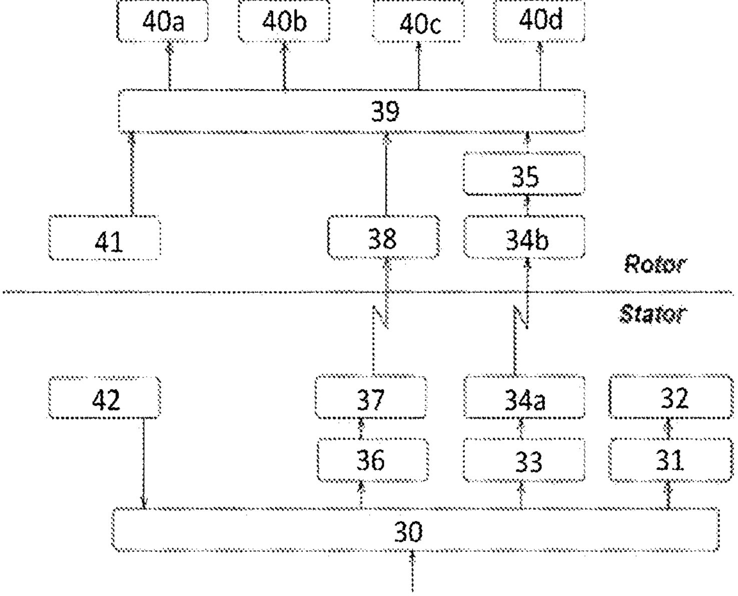
FIG. 6 shows a block diagram of the electrical and electronic components of a display module.

FIG. 6 shows a block diagram of the electrical and electronic components of a display module. The components are divided conceptually by the horizontal line into a rotor and a stator as shown by the corresponding labels. The rotor is the moving part of the display module, and the stator is the stationary part.

In the stator, data is received from an external control unit 11 by an FPGA 30. This data includes a reference signal and image data to be displayed by the display module. The external control unit 11 divides an overall image to be displayed by an array of the display modules so that only the data for the portion of the image to be displayed by each display module is transmitted to that display module.

Figure 9:
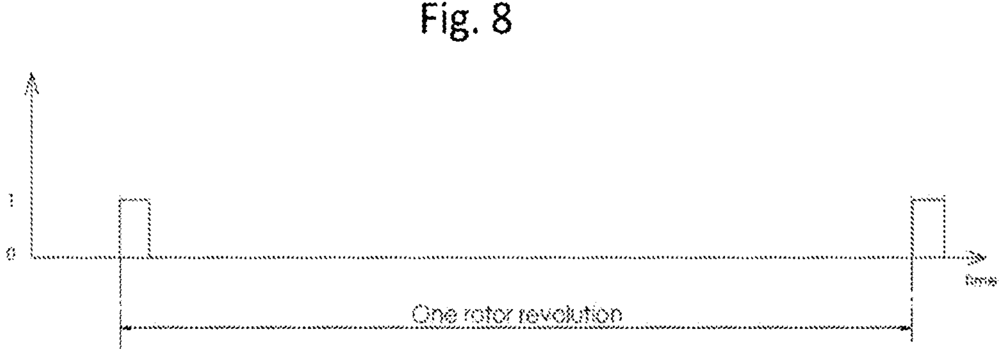
FIG. 9 shows the reference signal.

The reference signal is shown in FIG. 9. It consists of periodically generated pulses. The period between pulses in the signal is equal to the time for one rotor revolution. Thus, if the rotor is required to rotate at 750 revolutions per minute, the period between pulses will be 80 milliseconds. In other words, the pulses will be generated at a rate of 12.5 Hz.

The FPGA 30 contains a phase shift calculation module and a phase correction module which work together to maintain the speed of rotation of the rotor at the desired rate. They also maintain a desired position at which the cross-shaped arms (and hence arrays of LEDs) lie when each pulse in the reference signal is produced. This function will be explained later.

The FPGA 30 provides signals (derived from the phase correction module as will be explained later) to control a motor driver 31 which drives a BLOC motor 32 that rotates the rotor. The signals provided to motor driver 31 cause it to control the speed of rotation of the BLOC motor 32.

To provide power from the stator to the rotor, the FPGA 30 is connected to a wireless power driver 33 which drives a transformer winding 34*a*. A corresponding transformer winding 34*b* in the rotor is coupled to wireless power driver 35. Power is therefore made available to the rotor for the electronics and the LEDs.

The shaft of the BLDC motor 32 is hollow, and this enables optical transmission of the image data representing the image to be displayed by the display module from the FPGA 30 to the rotor. To achieve this, the FPGA 30 can control a laser driver 36 to drive a laser 37 which is in optical communication with a photodiode 38 through the hollow shaft of the BLDC motor 32. The photodiode 38 is in turn coupled to an FPGA 39 on the rotor. Thus, by using the laser driver 36 to modulate the light transmitted by the laser 37 to photodiode 38, it is possible to transmit the image data from the stator to the rotor.

The FPGA 39 is coupled to four arrays of LEDs 40*a* to 40*d*. Each of these lies on a respective one of the parts of the cross-shaped arms extending from the centre where the arms meet outwardly. They extend in a linear fashion. Thus, by illuminating the LEDs as the arms on which they lie rotate, it is possible to generate an image by persistence of vision. The manner in which this is controlled by the FPGA 39 will be described subsequently.

Two optical sensors 41 and 42 are also provided, one connected to each of the FPGAs 30 and 39. The function of these will be described below.

The sensor 41 on the rotor is responsible for image synchronisation, whereas sensor 42 is responsible for maintaining the speed of rotation of the rotor (under control of the BLDC motor 32) and its relative position as it rotates.

Figure 7:
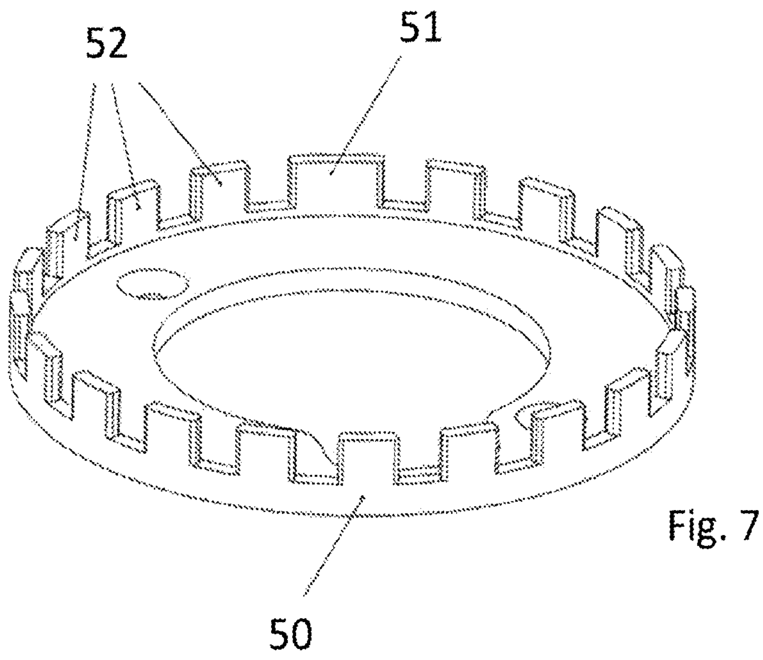
FIG. 7 shows a castellated disc for use with a sensor in the display module.

FIG. 7 shows a castellated disc 50 which is coupled to the rotor and rotates with it. The castellations on the disc extend perpendicularly from the disc 50. The sensor 42 detects the passage of each castellation and generates a corresponding pulse. An indexing castellation 51 is larger than the nineteen sub-indexing castellations 52. Thus, the passage of the indexing castellation 51 generates a longer pulse than those generated by the passage of the sub-indexing castellations 52.

Figure 8:
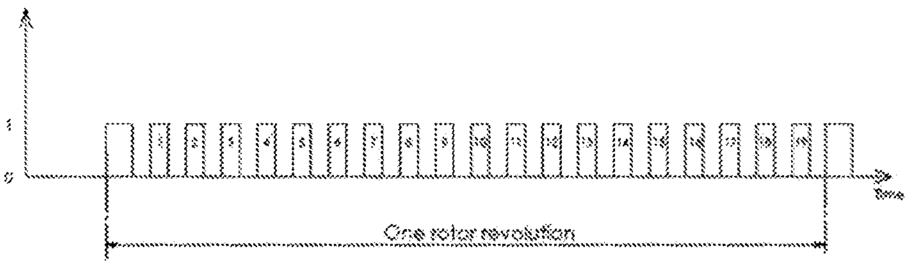
FIG. 8 shows the signal produced by the sensor.

The resultant synchronisation signal is shown in FIG. 8. Essentially, the longer pulse produced by the indexing castellation passing the sensor 42 occurs once every revolution and each of the longer pulses is followed by the shorter pulses generated by each sub-index castellation 52 passing the sensor.

The FPGA 30 receives this synchronisation signal from the sensor 42 and passes it to the phase shift calculation unit. The phase shift calculation unit also receives the reference signal generated by the external control unit 11. The reference signal shown in FIG. 9 is phase shifted by an amount equal to the required phase shift of the display module (calculated as discussed below). The leading edges of each adjacent pair of pulses in the reference signal represents a phase shift of 360°. For example, if the period of the reference signal is 80 milliseconds, and the indexing pulse generated by the indexing castellation passing the sensor 42 arrives 10 milliseconds after the pulse of the reference signal, the phase shift between the two is 45°. The phase shift calculation unit measures the time difference between the pulses in the phase-shifted reference signal and the longer, indexing pulse generated by the indexing castellation passing the sensor 42. This time difference will be zero when the required phase shift is achieved.

Thus, if the time difference is not zero, correction is needed. This correction is achieved by adjusting the speed of the BLOC motor 32. The phase correction module does this. In response to receiving an indication from the phase shift calculation module that the timer difference is not zero, the phase correction module produces appropriate signals to be provided to the motor driver 31 to cause the BLOC motor 32 to speed up or slow down as appropriate to bring the time difference to zero and hence, the phase shift is brought to the required value. Once the required value has been achieved, this feedback mechanism can maintain it at that value.

The sub-indexing pulses can be used by the phase shift calculation unit to detect variations from the desired phase shift before the next indexing pulse is received. This is possible by interpolating between the pulses of the reference signal to predict when the next sub-indexing pulse should be received. Although not essential, the sub-indexing pulses improve the accuracy of the system.

The sensor 41 detects the passage of image synchronisation features on the rotor and produces a pulse with the passage of each such feature. An image controller in the FPGA 39 processes this pulse received from the sensor 41. Since there is a fixed spatial relationship between the image synchronisation features and the LEDs, the position of the LEDs can be inferred from the pulses produced by the passage of the image synchronization features past the sensor 41.

The display area and image are split into sectors (for example, 2000 sectors). When the image controller receives a pulse, it commences displaying the content associated with that sector (which will be different parts of the image for each of the four LED arrays 40*a* to 40*d*) that are between this pulse and the adjacent one. It can keep synchronised by calculating the time available within the sector to display the associated content.

It is not essential to use two sensors as in this implementation. Instead, it would be possible to use just sensor 42 and pass information on the position of the rotor to the image controller from the phase shift calculation module.

During setup of a display system, a user may use a mobile device or computer run software that interfaces with the external control unit 11. This software is used to assign each display module in the system to a particular location within the array of display modules. The external control module 11 then decides on a direction of rotation and initial phase shift. For example, the rearwards modules in the system of FIG. 5*b* may be assigned a clockwise rotational direction, and the forwards modules may be assigned an anti-clockwise rotational direction. The initial phase shift is selected so that each display is at 45° to its neighbouring displays. For example, the forwards modules may be set to an initial phase shift of 0° and the rearwards modules to an initial phase shift of 45°. Although, the angles of 0° and 45° are usually used, other pairs angles with a suitable difference may be used instead. What is required is that the difference between the angles chosen for adjacent modules (i.e. between forwards and rearwards modules in this example) is such that the arms on which the LEDs are mounted on a forwards module will not occupy a position in which the arms will obscure the LEDs of a rearwards module as they rotate.

This initial phase shift may be adjusted by the angle at which the two sensors 41 and 42 lie with respect to each other, in other words, the angle subtended by the two sensors when joined by straight lines to the central axis of rotation. For one of the groups of displays rotating in one of the two directions (clockwise and anti-clockwise), the adjustment is made by adding the angle, and in the other direction by subtracting the angle.

A calibration is then performed to determine an offset angle and translation for each display module to ensure that its image is in the correct orientation and position. This is done by displaying calibration images on each display module and accepting user input to indicate how these images need to be adjusted to account for small discrepancies caused by imperfect mounting of a display module and for situations where it has been necessary to mount it at an angle, on its side or upside-down. The translation input for each display module is used to adjust the portion of the image or video data that is transmitted by the external control module 11 to that display module. The offset angle for each display module is either added to the adjusted initial phase shift where the display module rotates in one of the clockwise or anti-clockwise directions or subtracted from the adjusted initial phase shift where the display module rotates in the other of the clockwise or anti-clockwise directions. The offset angle for each display module in the array are also transmitted by the external control module 11 to that display module so that the FPGA 39 can apply the offset to the image data as it it displayed.

The above process results in a set of phase shifts that bring all the display modules to the position at which the images displayed on each of the display modules will be aligned with each other and at which the arms on which the LEDs are mounted do not obscure the LEDs on adjacent displays.

The set of phase shifts calculated above can then be transmitted to the respective display modules and used as the phase shift by which the reference signal must be adjusted. As described above, the speed of the BLOC motor can then be adjusted to maintain the phase shift between the indexing pulse and the pulse in the phase-shifted reference signal at 0°.

In this way, the display modules operate such that the arms of one display module never occupy a position in which they obscure the LEDs of another display module. The dead pixels problem is therefore overcome.

Figure 10:
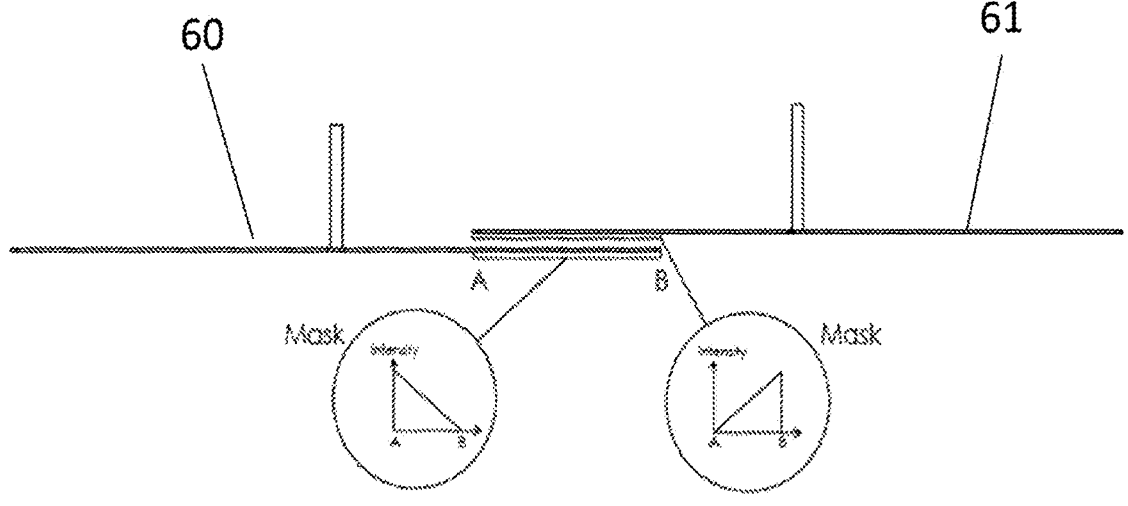
FIG. 10 illustrates how gradient masks can be used with adjacent display modules.

FIG. 10 shows how the overlapping region of two adjacent display modules may have a brightness gradient mask applied to the image generated by each of the display modules. In this example, the overlapping region extends from A to B (in the cross-section shown in the figure). The image brightness mask applied to the front display module 60 causes the brightness of the image generated by the front display module 60 to decrease from 100% to 0% linearly from point A to point B. Likewise, the image brightness mask applied to the rear display module 61 causes the brightness of the image generated by the front display module 61 to decrease from 100% to 0% linearly from point B to point A. This diminishes the effect of the second image artefact discussed above which appears in the gap between adjacent displays when viewed off-axis. This is because each of the two display modules 60 and 61 is generating part of the overall image. When viewed on-axis, the image appears perfect. When viewed off-axis any tendency for the second image artefact to be present is radically diminished.

What is claimed is:

1. A display system comprising a plurality of display modules, each display module comprising:

at least one light source movable along a predetermined closed path;

an image controller adapted to modulate an intensity of light emitted by the at least one light source as it moves along the predetermined closed path so as to cause a desired image to be visible by virtue of persistence of vision;

a drive mechanically coupled to the at least one light source for moving the at least one light source along the predetermined closed path;

a sensor which generates a synchronization signal including a synchronization feature indicating a passage of the at least one light source past a datum point on the predetermined closed path; and a drive controller for controlling a speed of the drive, the drive controller being adapted to receive the synchronization signal from the sensor and a reference signal including a periodic timing feature having a period based on a desired speed of revolution of the at least one light source along the predetermined closed path, wherein the drive controller is further adapted to produce a drive signal to control the speed of the drive such that a phase shift between the synchronization feature or a phase-shifted version of it and the timing feature or a phase-shifted version of it is maintained at a predetermined value;

wherein the plurality of display modules are arranged into at least two groups, each of the at least two groups comprising one or more of the plurality of display modules, and the predetermined closed path of the or each display module in each group lying in a plane associated with the group, the plane associated with each group being unique to that group;

wherein the display modules are disposed such that each lies within a region around an intersection of a row and a column in a grid, each module being adjacent, in its row and column, only to modules in a different one of the at least two groups, the light sources of each adjacent pair of display modules moving along their predetermined closed paths in opposing senses and the predetermined closed paths of each adjacent pair overlapping;

wherein the predetermined value of the phase shift between the synchronization feature or phase-shifted version of it and the timing feature or phase-shifted version of it for each of the plurality of display modules is selected such that the at least one light source or a member on which it is mounted does not occupy a position in which the at least one light source or the member on which it is mounted obscures the at least one light source of another of the plurality of display modules;

wherein the predetermined value of the phase shift comprises an initial phase shift for each display module that is adjusted by a user-input calibration amount to account for misalignment of the display module with one or more adjacent display modules.

2. A display system according to claim 1, wherein the sensor of each display module detects the passage of a respective indexing feature having a fixed spatial relationship to the at least one light source of the display module as it moves along its predetermined closed path, the sensor generating a pulse in the synchronization signal in response to the passage of the indexing feature past the sensor.

3. A display system according to claim 2, wherein each display module further comprises:

one or more sub-indexing features spaced apart from each other and from the respective indexing feature such that each one of the indexing and sub-indexing features passes the sensor in turn as the at least one light source moves along the predetermined closed path, the sensor generating a pulse in the synchronization signal in response to the passage of the or each sub-indexing feature past the sensor; or a second sensor which generates an image synchronization signal indicating the passage of the at least one light source past an image start point on the predetermined closed path.

4. A display system according to claim 1, wherein the image controller of each display module is further adapted to modulate the intensity of light emitted by the at least one light source in accordance with a respective brightness mask to adjust the intensity of light emitted by the at least one light source based on a predefined profile.

5. A display system according to claim 1, wherein the predetermined value of the phase shift between the synchronization feature or phase-shifted version of it and the timing feature or phase-shifted version of it for each of the plurality of display modules is dynamically adjustable.

6. A display system according to claim 1, wherein each of the plurality of display modules is arranged into a respective one of first and second groups, each module in the first group being adjacent, in its row and column, only to modules in the second group and each module in the second group being adjacent, in its row and column, only to modules in the first group.

7. A display system according to claim 1, wherein the phase shift between the synchronization feature or phase-shifted version of it and the timing feature or phase-shifted version of it of each display module is a multiple of 45° and different to the phase shift between the synchronization feature or phase-shifted version of it and the timing feature or phase-shifted version of it of each adjacent display module in its row and column.

8. A display system according to claim 1, further comprising an external control unit which generates the reference signal.

9. A display system according to claim 8, in which each display module is assigned to a respective row and column within the grid, and wherein the external control unit comprises a memory in which the assigned row and column for each display module is stored.

10. A display system according to claim 9, wherein the external control unit:

is coupled to each of the display modules by a communications link over which image data may be transmitted to each display module, the image data representing a portion of an overall image to be displayed by all of the display modules together;

comprises an image processor which, for each display module, offsets the portion of the overall image represented by the image data by a calibration amount to account for misplacement of the display module.

11. A display system according to claim 1, wherein the predetermined value of the phase shift between the synchronization feature or phase-shifted version of it and the timing feature or phase-shifted version of it for each of the plurality of display modules is selected such that the difference between the predetermined values of each adjacent pair has a desired value or lies between upper and lower threshold values, thereby setting an initial phase shift between the synchronization feature or phase-shifted version of it and the timing feature or phase-shifted version of it for each of the plurality of display modules.

12. A display system according to claim 11, wherein the initial phase shift for each display module:

is adjusted by addition or subtraction of an amount equal to an angle subtended by the sensor and a second sensor on the display module when joined by straight lines to a center of the predetermined closed path, the second sensor generating an image synchronization signal indicating the passage of the at least one light source past an image start point on the predetermined closed path; or is adjusted by a calibration amount input by a user to account for misalignment of the display module with one or more adjacent display modules.

13. A method for displaying a desired image using a plurality of display modules, each having at least one light source moveable along a respective predetermined closed path, the method comprising:

arranging the plurality of display modules into at least two groups, each of the at least two groups comprising one or more of the plurality of display modules, and the predetermined closed path of the or each display module in each group lying in a plane associated with the group, the plane associated with each group being unique to that group;

disposing the display modules such that each lies within a region around an intersection of a row and a column in a grid, each module being adjacent, in its row and column, only to modules in a different one of the at least two groups, the light sources of each adjacent pair of display modules moving along their predetermined closed paths in opposing senses and the predetermined closed paths of each adjacent pair overlapping; and carrying out the following steps at each of the plurality of display modules:

moving the at least one light source along its respective predetermined closed path;

modulating an intensity of light emitted by the at least one light source of each of the plurality of display modules as it moves along its respective predetermined closed path so as to cause a respective portion of the desired image to be visible by virtue of persistence of vision, the respective portions of the desired image visible on each of the plurality of display modules together forming the desired image;

generating a respective synchronization signal including a synchronization feature indicating a passage of the at least one light source past a datum point on the respective predetermined closed path;

receiving a reference signal including a periodic timing feature having a period based on a desired speed of revolution of the at least one light source along the respective predetermined closed path; and controlling a speed with which the at least one light source moves along the respective predetermined closed path such that a phase shift between the synchronization feature or a phase-shifted version of it and the timing feature or a phase-shifted version of it is maintained at a predetermined value;

wherein the predetermined value of the phase shift between the synchronization feature or phase-shifted version of it and the timing feature or phase-shifted version of it for each of the plurality of display modules is selected such that the at least one light source does not occupy a position in which it obscures the at least one light source of another of the plurality of display modules;

wherein the predetermined value of the phase shift comprises an initial phase shift for each display module that is adjusted by a user-input calibration amount to account for misalignment of the display module with one or more adjacent display modules.

14. A method according to claim 13, further comprising: detecting at each display module, with a respective sensor, the passage of an indexing feature having a fixed spatial relationship to the at least one light source as it moves along the predetermined closed path, the sensor generating a pulse in the synchronization signal in response to the passage of the indexing feature past the sensor;

wherein, at each display module, the sensor generates a pulse in the synchronization signal in response to the passage of one or more sub-indexing features spaced apart from each other and from the indexing feature such that each one of the indexing and sub-indexing features passes the sensor in turn as the at least one light source moves along the predetermined closed path.

15. A method according to claim 13, further comprising: generating at each display module an image synchronization signal indicating the passage of the at least one light source past an image start point on the predetermined closed path; or modulating at each display module the intensity of light emitted by the at least one light source in accordance with a brightness mask to adjust the intensity of light emitted by the at least one light source based on a predefined profile; or dynamically adjusting the predetermined value of the phase shift between the synchronization feature or a phase-shifted version of it and the timing feature or a phase-shifted version of it for each of the plurality of display modules; or arranging the plurality of display modules into first and second groups, each module in the first group being adjacent, in its row and column, only to modules in the second group and each module in the second group being adjacent, in its row and column, only to modules in the first group; or generating the reference signal using an external control unit; or assigning each display module to a respective row and column within the grid and storing the assigned row and column for each display module in the external control unit; or transmitting image data to each display module, the image data representing a portion of an overall image to be displayed by all of the display modules together.

16. A method according to claim 15, wherein, for each display module, the portion of the overall image represented by the image data is offset by a calibration amount to account for misplacement of the display module.

17. A method according to claim 13, wherein the phase shift between the synchronization feature or phase-shifted version of it and the timing feature or phase-shifted version of it of each display module is a multiple of 45° and different to the phase shift between the synchronization feature of phase-shifted version of it and the timing feature or phase-shifted version of it of each adjacent display module in its row and column.

18. A method according to claim 13, wherein the predetermined value of the phase shift between the synchronization feature or a phase-shifted version of it and the timing feature or a phase-shifted version of it for each of the plurality of display modules is selected such that the difference between the predetermined values of each adjacent pair has a desired value or lies between upper and lower threshold values, thereby setting an initial phase shift between the synchronization feature or phase-shifted version of it and the timing feature or phase-shifted version of it for each of the plurality of display modules.

19. A method according to claim 18, wherein the initial phase shift for each display module is adjusted by addition or subtraction of an amount equal to an angle subtended by first and second sensors on the display module when joined by straight lines to a center of the predetermined closed path, the first sensor detecting the passage of an indexing feature having a fixed spatial relationship to the at least one light source as it moves along the predetermined closed path and the second sensor generating an image synchronization signal indicating the passage of the at least one light source past an image start point on the predetermined closed path.

20. A method according to claim 19, wherein the initial phase shift for a display module is adjusted by a calibration amount input by a user to account for misalignment of the display module with one or more adjacent display modules.

* * * * *